United States Patent [19]

Balsells

[11] Patent Number: 4,893,795
[45] Date of Patent: Jan. 16, 1990

[54] RADIALLY LOADED CANTED COILED SPRING WITH TURN ANGLE

[75] Inventor: Peter J. Balsells, P.O. Box 15092, Santa Ana, Calif. 92705

[73] Assignees: Peter J. Balsells; Joan C. Balsells, both of Santa Ana, Calif.

[21] Appl. No.: 232,430

[22] Filed: Aug. 15, 1988

[51] Int. Cl.[4] .............................................. F16F 1/06
[52] U.S. Cl. ...................................... 267/1.5; 267/167; 267/180; 277/164
[58] Field of Search ............. 267/286, 1.5, 166, 166.1, 267/167, 180, 33; 277/163, 164

[56] References Cited

U.S. PATENT DOCUMENTS

| | | | |
|---|---|---|---|
| 1,473,446 | 11/1923 | Scott | 277/163 |
| 1,867,723 | 7/1932 | Adams | 267/167 |
| 2,154,275 | 4/1939 | Linn | 248/358 |
| 2,610,846 | 9/1952 | Hanna | 267/1.5 |
| 2,859,033 | 11/1958 | Rose | 267/1.5 |
| 3,061,060 | 10/1962 | Stephenson | 192/41 |
| 3,183,010 | 5/1965 | Bram | 277/235 |
| 3,223,785 | 6/1967 | Mather | 267/1.5 |
| 3,468,527 | 9/1969 | Mather | 267/1.5 |
| 4,655,462 | 4/1987 | Balsells | 277/164 |

Primary Examiner—Andres Kashnikow
Assistant Examiner—Matthew L. Graham
Attorney, Agent, or Firm—Walter A. Hackler

[57] ABSTRACT

A radially resilient canted coiled springs includes a plurality of coils canted along a centerline thereof with each coil having a trailing portion and a leading portion. The disposition of the trailing portion is defined by a back angle between the trailing portion and a line normal to the centerline and the disposition of the leading portion is defined by a front angle between the leading portion and a normal line. Specific resilient performance, or load-deflection characteristics of the radially resilient canted coiled springs is determined by controlling a turn angle of the coil spring.

16 Claims, 5 Drawing Sheets

SPRING TURNED 90°

SPRING TURNED
30° COUNTERCLOCKWISE

FLAT SPRING

SPRING TURNED
30° CLOCKWISE

SPRING TURNED
60° CLOCKWISE

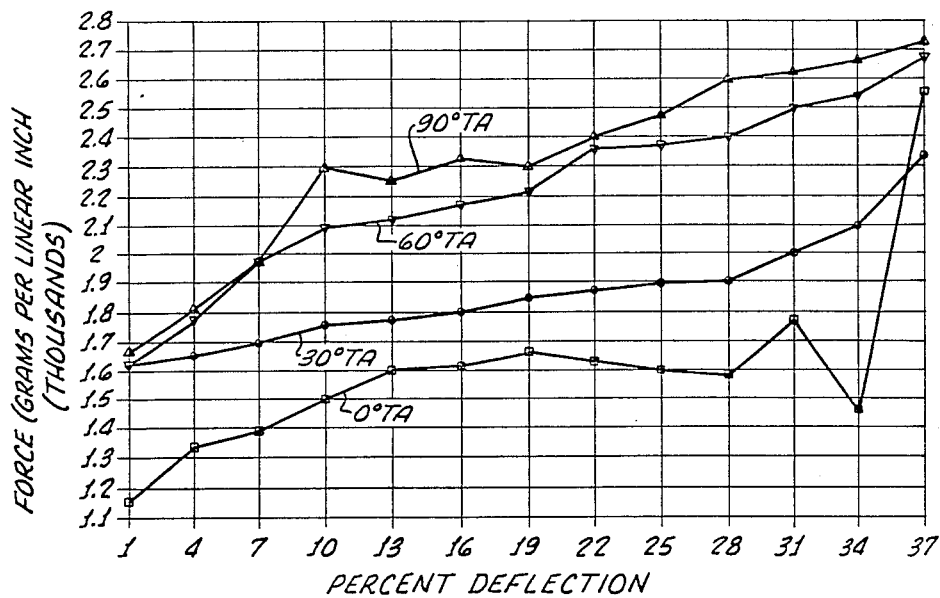
_FIG. 7._
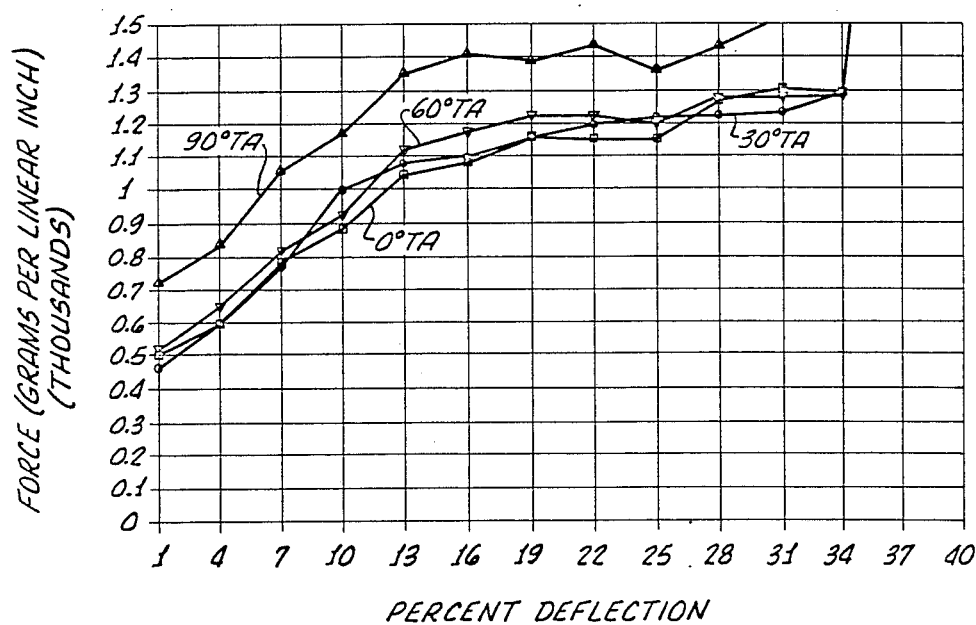
_FIG. 8._

RADIALLY LOADED CANTED COILED SPRING WITH TURN ANGLE

The present invention generally relates to canted-coiled springs and seals and, more particularly, relates to radially resilient canted-coiled springs having a preselected turn angle for enabling specific radial load-deflection characteristics.

The load deflection characteristics of garter-type axial springs have been studied extensively, see companion U.S. Pat. No. 4,830,344, which is to be incorporated, by specific reference thereto, into the present application. As is explained in the reference, many parameters, including the wire size, the coil height, the coil spacing, and the front angle, which defines a leading portion of each canted spring coil may be varied to tailor the load-deflection characteristics of the spring.

As set forth in companion U.S. patent application, Ser. No. 186,016, each filed on Apr. 25, 1988, U.S. Pat. No. 4,826,144 and incorporated herewith by specific reference thereto, springs may also have coils which are interconnected in a manner forming a garter-type axially resilient coil spring with the trailing portion along an outside diameter of the garter-type axially resilient coil spring, and the leading portion along an inside diameter of the garter-type axially resilient coil spring, or with the trailing portion along an inside diameter of the garter-type axially resilient coil spring and the leading portion along an outside diameter of the garter-type axially resilient coil spring. These references teach the tailoring of the load-deflection characteristics of a garter-type axially resilient coil spring beyond the range normally achieved with conventional garter-type axially resilient coil springs.

This feature enables a spring to be formulated with generally higher load-deflection characteristics. That is, the spring is able to exert a greater force in response to a given deflection than a conventional spring having the same dimensions and wire size.

As a result, these springs can be fabricated from smaller wire and have a closer coil spacing, while still exerting the same force in response to deflection as prior art springs.

It should be recognized that this characteristic is quite important, particularly when the springs are used in conjunction with a seal. Because seals are generally made from a soft material to enhance their sealing characteristics, they must be evenly loaded. That is, the stress concentration on the seal should be uniform in order that relatively high and low pressure points do not occur across the face of the seal, which leads to inefficient sealing. When non uniform loading occurs, the resultant high pressure points are subject to greater force and consequently greater wear, while at the same time, the necessary sealing force may not be provided in the low pressure points, the latter leading to providing unnecessarily high force concentration to the spring in order to effect proper sealing.

The present invention concerns a radially resilient canted coiled spring having a turn angle, as hereinafter defined and discussed, which can be varied in order to achieve higher load-deflection characteristics than heretofore possible utilizing the same wire diameters. The advantages of higher loading have been hereinabove discussed. In addition, the specific relationship and working resilient range of springs made in accordance with the present invention, can also be used to advantage and provide springs with tailored load-deflection characteristics which were not heretofore possible.

SUMMARY OF THE INVENTION

In accordance with the present invention, a radially resilient canted coiled spring seal includes a plurality of coils canted along a centerline thereof, with back angle means for defining the disposition of a trailing portion of each coil with respect to a line normal to the centerline.

It should be appreciated that the determination of the force-deflection characteristics apply only to springs which are allowed to flex in an uninhibited manner as distinguished from "springs" which are filled with an elastomer, or the like, as set forth in U.S. Pat. No. 3,183,010 to Bram, the latter truly being characterized as reinforcement elements rather than springs.

In accordance with the present invention, the back angle means determines, in combination with the turn angle, hereinafter described, the load-deflection characteristics of the spring which includes the peak point and the working deflection range of the spring. As set forth in the hereinabove referenced companion patent application entitled, "Outside Back Angle Canted Coil Spring", by controlling the back angle, which defines the trailing portion of each coil, the resilient characteristics can be designed to meet criteria heretofore not possible without the control, selection and an adjustment of the back angle.

Means orienting said plurality of coils at turn angle are provided for further defining the load-deflection characteristics of the radially resilient canted coiled spring, said turn angle being greater than zero and less than 90 degrees.

Specifically, means orienting the plurality of coils may include annular seal means, with the latter providing means defining a cavity for supporting and orienting the radially resilient canted coiled spring with a turn angle of greater than zero degrees and less than 90 degrees. In addition, the radially resilient canted coiled spring may have the trailing portion disposed along an outside diameter thereof and the leading portion disposed along an inside diameter thereof. The back angle may be about 4 degrees and the front angle may be less than about 55 degrees.

Thereafter, two ends of the wound wire are attached in a manner forming a radially resilient canted coiled spring in an orientation defined by a turn angle, with the turn angle being greater than zero degrees and less than 90 degrees.

In the winding of a spring, the resulting, or measured, front and back angles may vary from the preselected values thereof. It has been found that springs made with the same preselected front and back angle values but sorted thereafter according to the measured value of the front angle or back angle have different load-deflection characteristics.

It has been unexpectedly found that a radially resilient canted coiled spring measured by the back angle has a higher load-deflection characteristic than a radially resilient canted coiled spring measured by the front angle despite the fact that the back angle and front angle have the same nominal valves for both springs.

BRIEF DESCRIPTION OF THE DRAWINGS

The advantages and features of the present invention will appear from the following description, when considered in conjunction with the accompanying drawings in which:

FIGS. 7-12 are load-deflection curves for various springs as herein described.

DETAILED DESCRIPTION

Figure 1:
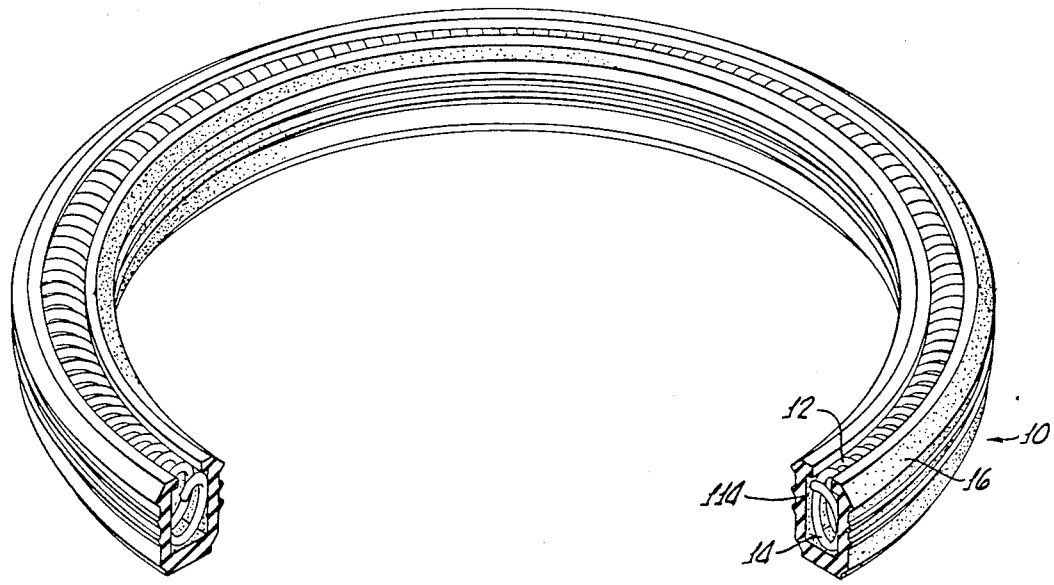
FIG. 1 is a perspective view of a radially loaded coiled spring seal, in accordance with the present invention, generally showing a plurality of coils interconnected in a manner forming a radially resilient canted coiled spring, with the spring being disposed in an annular seal with a preselected turn angle orientation for controlling the load-deflection characteristics of the radially resilient canted coiled spring, non-invasive support of the spring within the annular seal enabling independent working of the spring therein, thereby providing preselected force concentration on the sealing portions of the seal.

Turning now to FIG. 1, there is shown a radially resilient coiled spring and seal 10, in accordance with the present invention, generally showing a radially resilient spring 12 with a plurality of coils 14 in an annular seal 16 which provides means for non-invasively supporting the garter-type axially resilient coil spring 12, in a preselected orientation for controlling the resilient characteristics thereof, as hereinafter described in greater detail.

Figure 2:
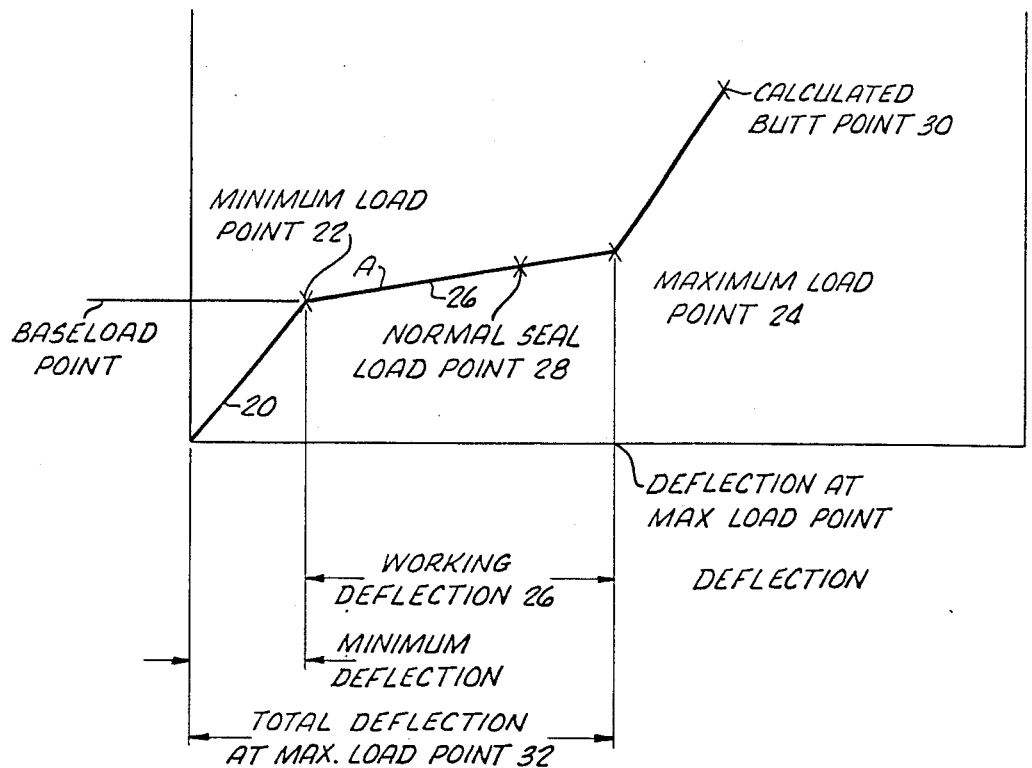
FIG. 2 shows a typical load-deflection curve for a spring for the purpose of defining the nomenclature thereof.

In FIG. 2, there is shown a load-deflection curve, A, for the purpose of illustrating the characteristics of radially resilient canted coiled springs.

As shown by curve A when a load is radially applied to a radially resilient spring, the spring exhibits general linear load-deflection relationship as shown by the line segment 20 until it reaches minimum load point 22, which represents the point at which, after initial deflection, the load begins to remain relatively constant.

Between the minimum load point 22 and a maximum load point 24, the load-deflection curve may be constant or show a slight increase, as shown in FIG. 2. The area between the minimum load point 22 and the maximum load point 24 is known as the working deflection range 26. The spring is normally loaded for operation within this range, as indicated by point 28, for a typical spring utilized in conjunction with seal, gasket, or the like, for sealing purposes.

Loading of the spring beyond the maximum load point 24 results in abrupt deflection response until it reaches a butt point 30, which results in a permanent set in the spring as a result of overloading. Also indicated in FIG. 2, is the total deflection range 32 which is defined as the deflection between the unloaded spring and the deflection at the maximum load point 24.

Figure 3:
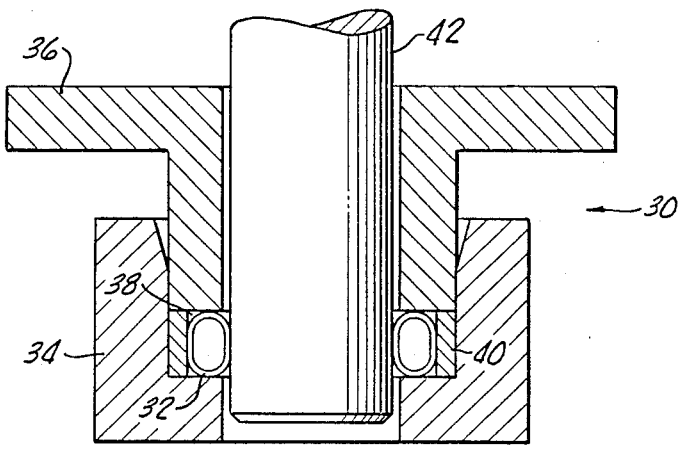
FIG. 3 shows test jig apparatus for the determination of the load-deflection characteristics as shown in FIG. 2.

The load-deflection characteristics may be determined with a test jig 30 as shown in FIG. 3. A radially resilient spring 32 is held within a housing 34 by a fixture 36, thereby entrapping the spring 32 in a cavity 38. A circumferential spacer 40 is used to load the outside diameter of the spring 32 and the force required to pass a plug 42 through the inside diameter of the spring 32 is measured.

Figure 4:
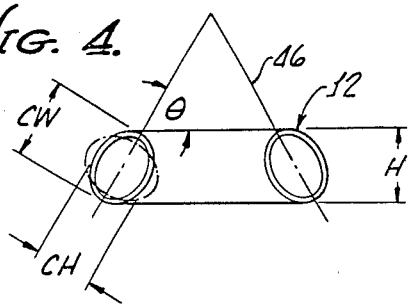
FIG. 4 is a schematic of a radially loaded coiled spring with turn angle $\theta$ shown for the purpose of illustrating how the turn angle $\theta$ may be determined.

FIG. 4 shows in schematic form, a cross-section of a canted coil spring 12, in accordance with the present invention, with a turn angle of $\theta$, a measured coil width of C.W, a measured coil height of CH and a measured spring height H of the spring 12. As shown in FIGS. 4, the turn angle may be clockwise (bold lines) or counterclockwise. (Dashed lines). The turn angle $\theta$ may be defined as an angle formed by a generally circular spring forming a cone or inverted cone, depending on the position of the spin, and measuring the turn angle for the horizontal to the intersection through the center line 46 of the spring 12.

Figure 5A:
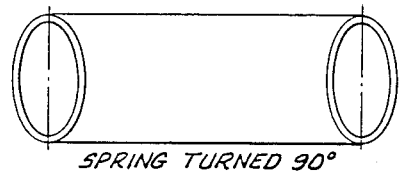
FIGS. 5a, b, c and d and e illustrate radially resilient canted coiled springs having various turn angles.
Figure 5B:
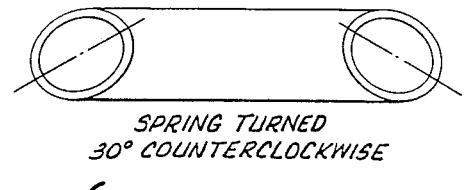
Figure 5C:
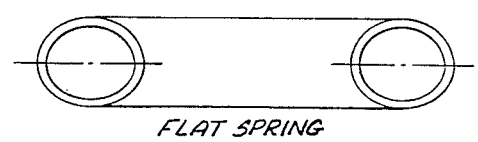
Figure 5D:
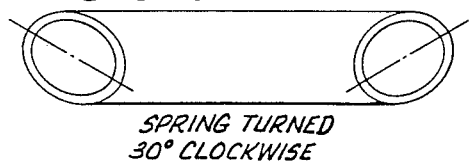
Figure 5E:
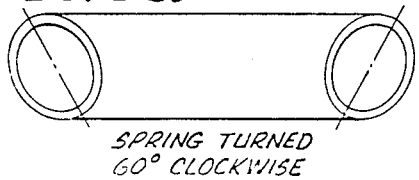

As shown in FIGS. 5a, b, c, d and e, a radially resilient spring may be turned up counterclockwise, for example, 30 degrees, as shown in FIG. 5b, or turned clockwise, as for example, shown in FIGS. 5d and 5e, with 30 degrees and 60 degrees turn angles, respectively. It should be appreciated that while the springs shown are shown with a circular shape, other shapes are possible, such as elliptical or rectangular, depending upon the configuration of the mating parts between which the spring 12 and/or seal 16 are to be placed.

As shown in the Figures, the turn angle—is defined as an angle formed by a generally circular spring forming a cone or an inverted cone, depending on the position of the spring and measuring the angle $\theta$ from the horizontal to the intersection through the centerline of each cone, or inverted cone. By varying the turn angle $\theta$, different loads can be obtained and the degree of loading depends upon the turn angle $\theta$. That is, the higher the turn angle $\theta$, the higher the force developed, as will be hereinafter demonstrated. It should be noted that the force developed upon loading, is independent upon whether the spring is in the cone shape as shown in FIG. 5b, or an inverted cone as shown in 5d. That is, the springs in 5b and 5d will perform in identical fashion.

Figure 6A:
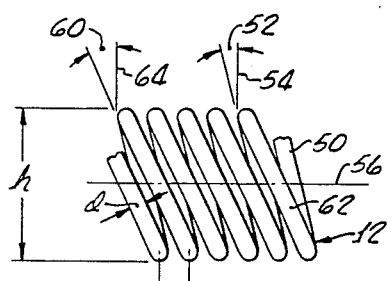
FIGS. 6a, b are side views of springs showing leading and trailing portions of coils defined by front and back angles, respectively.
Figure 6B:
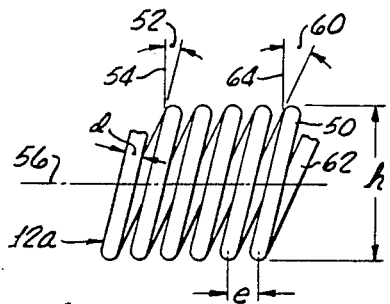

Turning to FIG. 6a and 6b, there is shown yet another variation of springs made in accordance with the present invention.

FIGS. 6a and 6b show a spring 12 having a trailing portion 50 defined by a back angle 52 made between the trailing portion 50 and a normal 54 to centerline 56 of the spring. A front angle 60 defines a leading portion 62 of the spring 12 by the angle the leading portion 62 makes with a normal 64 to the centerline 56. FIG. 6a shows the spring 12 having the trailing portion 50 along the inside diameter of the spring, with FIG. 6b showing a spring 12a having the trailing portion 50 along the outside diameter of the spring. As can be seen, from FIGS. 6a and b, as each coil is traced in a circular-like manner about the centerline, each revolution includes a trailing portion and a leading portion, with the leading portion advancing movement along the centerline more than the advancement along the centerline when following the trailing portion of the coil.

A more detailed description of inside back angle canted coil springs and outside angle canted coil springs may be had from the hereinabove referenced copending patent applications which are herewith expressively incorporated by reference thereto. The effect of the trailing portion being disposed on the inside or the outside of the canted coil spring 12 is an important parameter in the tayloring of radially resilient springs to have specific load-deflection characteristics.

As hereinafter shown, when loading the spring 12 angles of 0, 30, 60 and 90 in which the measured front angle is 30 degrees while the back angle is nominally 14 degrees.

TABLE 1

| Spring No. | Turn Angle | No Coils | ID | Angle Measured By | Coil Space Inch | WD | Coil Height (h) | D/d |
|---|---|---|---|---|---|---|---|---|
| RF 106MB | 0 | 58 | 0.65 | Back Angle = 14 | 0.018 | 0.022 | 0.162 | 7.36 |
| RF 106MB | 30 | 58 | 0.65 | Back Angle = 14 | 0.018 | 0.022 | 0.161 | 7.32 |
| RF 106MB | 60 | 58 | 0.65 | Back Angle = 14 | 0.018 | 0.022 | 0.161 | 7.32 |
| RF 106MB | 90 | 58 | 0.65 | Back Angle = 14 | 0.018 | 0.022 | 0.162 | 7.36 |
| RF 106MB | 0 | 58 | 0.65 | Front Angle = 30 | 0.018 | 0.022 | 0.162 | 7.36 |
| RF 106MB | 30 | 58 | 0.65 | Front Angle = 30 | 0.018 | 0.022 | 0.162 | 7.36 |
| RF 106MB | 60 | 58 | 0.65 | Front Angle = 30 | 0.018 | 0.022 | 0.162 | 7.36 |
| RF 106MB | 90 | 58 | 0.65 | Front Angle = 30 | 0.018 | 0.022 | 0.162 | 7.36 |
| RF 106MB(CC) | 0 | 58 | 0.65 | Back Angle = 17 | 0.0138 | 0.022 | 0.160 | 7.27 |
| RF 106MB(CC) | 30 | 58 | 0.65 | Back Angle = 17 | 0.0138 | 0.022 | 0.160 | 7.27 |
| RF 106MB(CC) | 60 | 58 | 0.65 | Back Angle = 17 | 0.0138 | 0.022 | 0.161 | 7.32 |
| RF 106MB(CC) | 90 | 58 | 0.65 | Back Angle = 17 | 0.0138 | 0.022 | 0.160 | 7.27 |
| RF 106MB(CC) | 0 | 58 | 0.65 | Front Angle = 31.5 | 0.0138 | 0.022 | 0.160 | 7.27 |
| RF 106MB(CC) | 30 | 58 | 0.65 | Front Angle = 31.5 | 0.0138 | 0.022 | 0.160 | 7.27 |
| RF 106MB(CC) | 60 | 58 | 0.65 | Front Angle = 31.5 | 0.0138 | 0.022 | 0.160 | 7.27 |
| RF 106MB(CC) | 90 | 58 | 0.65 | Front Angle = 31.5 | 0.0138 | 0.022 | 0.160 | 7.27 |
| RF X11661 | 0 | 41 | 0.63 | Front Angle = 38 | 0.033 | 0.022 | 0.162 | 7.36 |
| RF X11661 | 30 | 41 | 0.63 | Front Angle = 38 | 0.033 | 0.022 | 0.162 | 7.36 |
| RF X11661 | 60 | 41 | 0.63 | Front Angle = 38 | 0.033 | 0.022 | 0.162 | 7.36 |
| RF X11661 | 90 | 41 | 0.63 | Front Angle = 38 | 0.033 | 0.022 | 0.162 | 7.36 |
| RF X11661 | 0 | 41 | 0.63 | Back Angle = 16 | 0.033 | 0.022 | 0.162 | 7.36 |
| RF X11661 | 30 | 41 | 0.63 | Back Angle = 16 | 0.033 | 0.022 | 0.162 | 7.36 |
| RF X11661 | 60 | 41 | 0.63 | Back Angle = 16 | 0.033 | 0.022 | 0.162 | 7.36 |
| RF X11661 | 90 | 41 | 0.63 | Back Angle = 16 | 0.033 | 0.022 | 0.162 | 7.36 | radially, the load is greater when the turn angle is 90 degrees than when the turn angle is 0 degrees and such load increases progressively from 0 degrees to 90 degrees. In addition, a spring 12 with the back angle 52, or trailing portion 50 along the inside as I.D. of the spring will develop substantially higher force than a spring 12a having a back angle 52 or trailing portion 50 along the outside as O.D. of the spring with both springs having the same turn angle.

As hereinabove pointed out, this discovery enables greater tayloring ability. That is, a greater range of wire size and coil spacing can be used while still exerting the same or greater force in response to deflection. This has significant advantage when the spring is used in conjunction with a seal as hereinbefore described.

Table 1 sets forth the parameters of springs made in accordance with the present invention including the turn angle, number of coils, inside diameter (I.D.), the measured angle, coil spacing, wire diameter (W.D.), coil height (h) and coil diameter (d) to wire diameter. Most of these parameters are illustrated in FIGS. 6 and 6B. The springs are grouped in three categories; and RF 106MB, which has coil spacing of 0.018 inch, RF 106, MB(CC) having coil spacing of 0.0138 inch and RF X11661 having coil spacing of 0.033 inch. It should be pointed out that the greater the spacing between the coils, the greater difference between springs with a 0 degree turn angle and the spring with a 90 degree turn angle. This is generally shown in FIGS. 7–12 hereinafter described in greater detail.

Turning now to FIG. 7, there is shown the force or deflection curves for springs RF 106MB having turn angles (TA) of 0, 30, 60 and 90 degrees. It can be observed that in the working deflection range (see FIG. 2 for a definition) the force increases as the turn angle increases and the difference in load between the 0 degree turn angle and the 90 degree turn angle is about 39 percent.

As a comparison, shown in FIG. 8, as the load force-deflection characteristics of spring RF 106MB for turn Comparing FIG. 7 and FIG. 8 shows marked differences. First, the effect of the turn angle is far less than the turn angle effect of the spring shown in FIG. 7 for measured back angle springs. As shown in FIG. 8, when the turn angle is increased from 0 to approximately 60 degrees, there is little change in the force-deflection curve in the working deflection range. Increased turn angle from 60 degrees to 90 degrees shows an increase with the variation between the 0 degree turn angle and 90 degree turn angle of approximately 19.7 percent.

Figure 9:
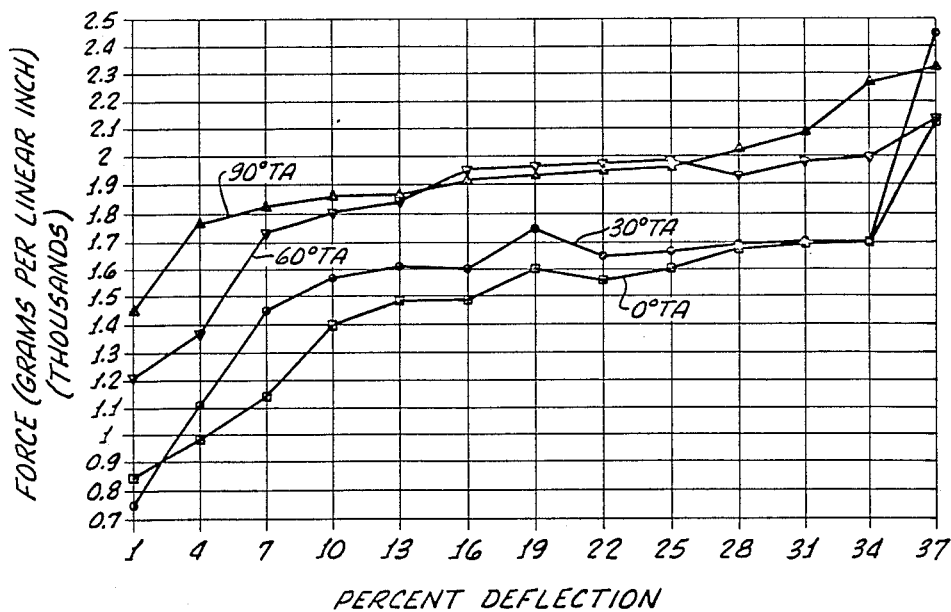
Figure 10:
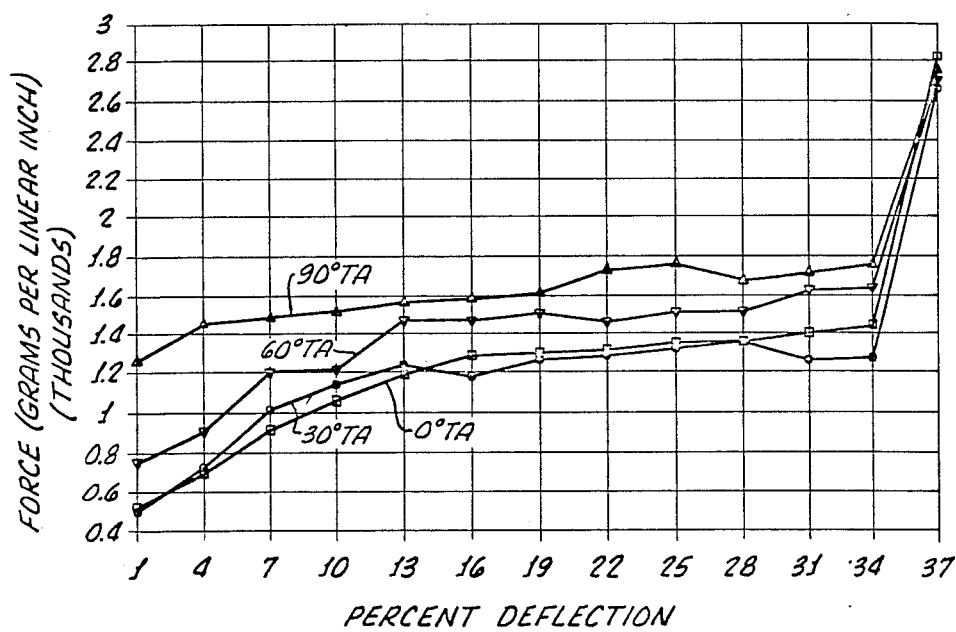

Similarly, FIGS. 9 and 10 each show four curves corresponding to spring RF 106MB(CC) having a spring spacing of 0.018 inches back angle of about 17 degrees and a front angle of about 31.5 degrees. FIG. 9 is a plot of those springs in which the back angle was measured at 17 degrees and FIG. 10 represents springs in which the front angle was measured at 31.5 degrees. All of the curves show a general increase in the force-deflection curve in the working deflection range as the turn angle is increased from 0 to 90 degrees. In this instance, the variation between the 0 turn angle spring and the 90 degree angle spring was 31 percent, for the back angle measured spring and 33 percent for the front angle spring.

Figure 11:
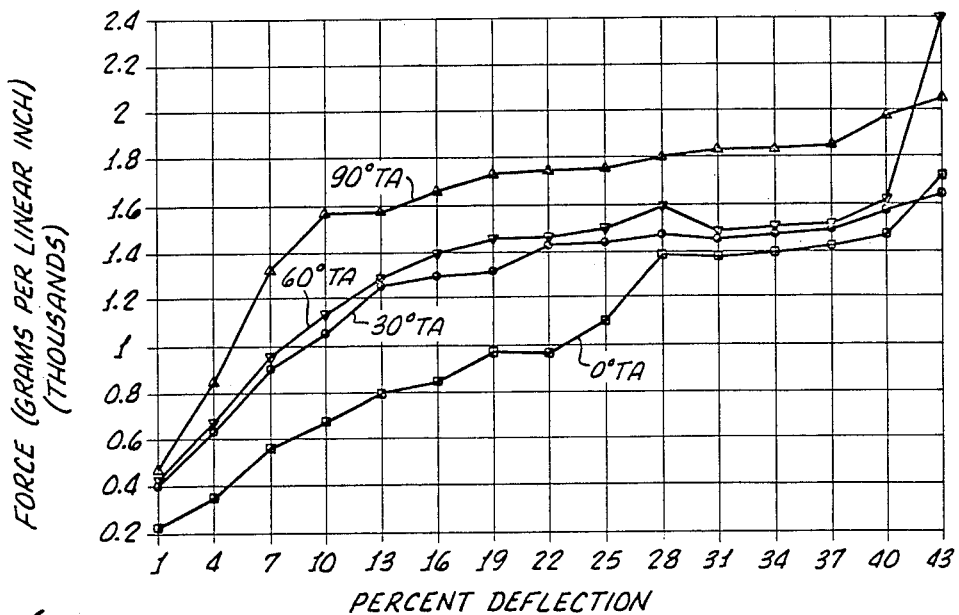
Figure 12:
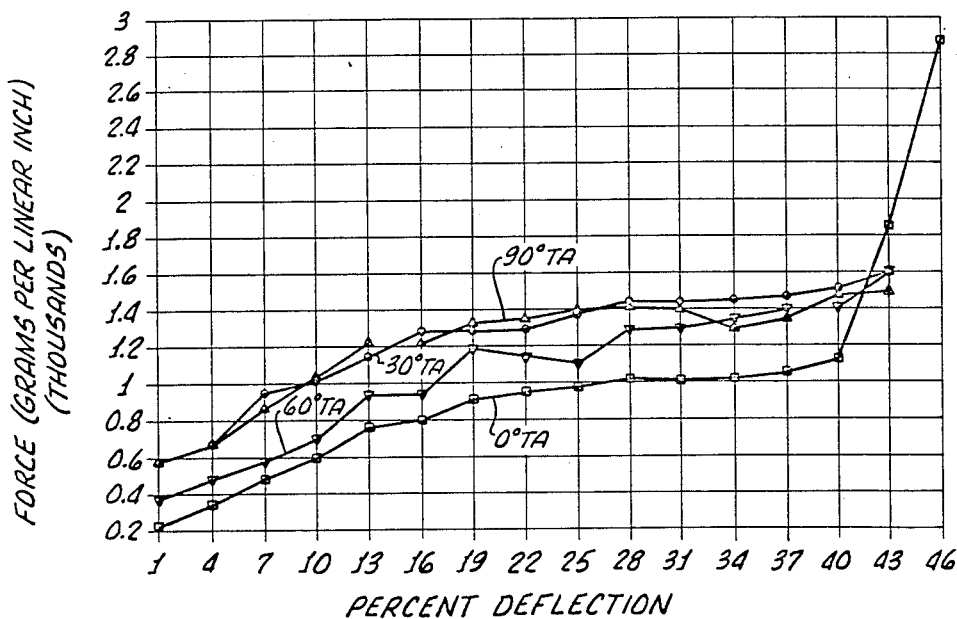

FIGS. 11 and 12 show the results of force-deflection testing for spring RF X11661 using turn angles from 0 to 90 degrees, as set forth in Table 1, FIG. 11 showing spring in which the back angle was measured and FIG. 12 showing the spring in which the front angle was measured. In each instance, the nominal back angle is 16 degrees and nominal front angle as 38 degrees.

As shown in FIG. 11, a spring with a turn angle of 90 degrees has a 77 percent force higher than the spring with a 0 degree turn angle. FIG. 12 shows the difference between the 90 degree turn angle and the 0 degree turn angle of only 37 percent.

It should be appreciated that the wire may be fabricated counterclockwise or clockwise and, accordingly, the coils may counterclockwise or clockwise. In either case, the performance is the same as long as the back angle and front angles are the same.

Although there has been described hereinabove a specific radially resistant canted coil spring and manufacture of an invention in accordance with the present invention, for purposes of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. A radially resilient canted coiled spring comprising:
    a plurality of coil means, interconnected and canted along a centerline thereof, for causing the coiled spring to exert a generally constant force over a preselected range of deflection of the coiled spring in response to radial loading;
    back angle means for defining the disposition of a trailing portion of each coil with respect to a line normal to the centerline;
    front angle means for defining the disposition of a leading portion of each coil with respect to the normal line, said front angle means being greater than said back angle means; and
    means, orienting said plurality of coil means at a turn angle, for controlling the magnitude of the generally constant force within the preselected range of deflection, said turn angle being greater than zero degrees and less than 90 degrees.

2. The radially resilient canted coiled spring according to claim 1 wherein the trailing portion is disposed along an outside diameter of the radially loaded canted coiled spring and the leading portion is disposed along an inside diameter of the radially resilient canted coiled spring.

3. The radially resilient canted coiled spring according to claim 2 where the turn angle is about 30 degrees.

4. The radially resilient canted coiled spring according to claim 2 wherein the turn angle is about 60 degrees.

5. The radially resilient canted coiled spring according to claim 1 wherein the trailing portion is disposed along an inside diameter of the radially loaded canted coiled spring and the leading portion is disposed along an outside diameter of the radially resilient canted coiled spring.

6. The radially resilient canted coiled spring according to claim 5 wherein the back angle is about 4 degrees.

7. The radially resilient canted coiled spring according to claim 6 wherein the front angle means is less than about 55 degrees.

8. The radially resilient canted coiled spring according to claim 7 wherein the radially resilient canted coiled spring is disposed in a seal at a preselected turn angle.

9. A radially resilient canted coiled spring seal comprising:
    a plurality of coil means, interconnected and canted along a centerline thereof, for causing the coiled spring to exert a generally constant force over a preselected range of deflection of the coiled spring in response to radial loading;
    back angle means for defining the disposition of a trailing portion of each coil with respect to a line normal to the centerline;
    front angle means for defining the disposition of a leading portion of each coil with respect to the normal line, said front angle means being greater than said back angle means; and
    annular seal means for non-invasively supporting the radially resilient canted coiled spring in an orientation for controlling the magnitude of the generally constant force within the preselected range of deflection, said orientation being defined by a turn angle, said turn angle being greater than zero degrees and less than 90 degrees.

10. The radially resilient canted coiled spring seal according to claim 9 wherein said annular seal means includes means defining a cavity for supporting and orienting said radially resilient canted coiled spring with a turn angle of greater than zero degrees less than 90 degrees.

11. The radially resilient canted coiled spring seal according to claim 10 wherein the turn angle is about 30 degree.

12. The radially resilient canted coiled spring seal according to claim 10 wherein the turn angle is about 60 degrees.

13. The radially resilient canted coiled spring seal according to claim 10 wherein the trailing portion is disposed along an outside diameter of the radially resilient canted coiled spring and the leading portion is disposed along an inside diameter of the radially resilient canted coiled spring.

14. The radially resilient canted coiled spring seal according to claim 10 wherein the leading portion is disposed along an inside diameter of the radially resilient canted coiled spring and the leading portion is disposed along an outside diameter of the radially resilient canted coiled spring.

15. The radially resilient canted coiled spring seal according to claim 10 wherein the back angle means is between about 4 degrees.

16. The radially resilient loaded canted coiled spring seal according to claim 15 wherein the front angle is less than about 55 degrees.

* * * * *